US009020250B2

(12) United States Patent
Singh et al.

(10) Patent No.: US 9,020,250 B2
(45) Date of Patent: Apr. 28, 2015

(54) METHODS AND SYSTEMS FOR BUILDING A UNIVERSAL DRESS STYLE LEARNER

(71) Applicant: Haileo, Inc., Los Angeles, CA (US)

(72) Inventors: Sudhir Kumar Singh, San Jose, CA (US); Vwani Roychowdhury, Los Angeles, CA (US)

(73) Assignee: Haileo, Inc., Los Angeles, CA (US)

( * ) Notice: Subject to any disclaimer, the term of this patent is extended or adjusted under 35 U.S.C. 154(b) by 350 days.

(21) Appl. No.: 13/622,917

(22) Filed: Sep. 19, 2012

(65) Prior Publication Data

US 2013/0071816 A1 Mar. 21, 2013

Related U.S. Application Data

(60) Provisional application No. 61/536,196, filed on Sep. 19, 2011.

(51) Int. Cl.
*G06K 9/00* (2006.01)
*G09B 19/00* (2006.01)
(52) U.S. Cl.
CPC ............ *G09B 19/00* (2013.01); *G09B 19/0076* (2013.01)

(58) Field of Classification Search
None
See application file for complete search history.

(56) References Cited

U.S. PATENT DOCUMENTS

| 2009/0116698 | A1* | 5/2009 | Zhang et al. ................. 382/111 |
| 2009/0192874 | A1* | 7/2009 | Powles et al. .................. 705/10 |
| 2013/0044944 | A1* | 2/2013 | Wang et al. ................... 382/165 |
| 2013/0071816 | A1* | 3/2013 | Singh et al. ..................... 434/81 |
| 2013/0236065 | A1* | 9/2013 | Wang et al. ................... 382/111 |
| 2013/0343615 | A1* | 12/2013 | Zhang et al. .................. 382/111 |

* cited by examiner

*Primary Examiner* — Sean Motsinger
(74) *Attorney, Agent, or Firm* — Orrick, Herrington & Sutcliffe, LLP

(57) ABSTRACT

This invention presents a universal framework for the discovery, understanding and matching of dress styles. In one embodiment, a computer-implemented method for building a universal dress style learner is disclosed, said method comprising: learning human skin models; detecting skin using the learned human skin models; collecting a set of dress images worn by a model; computing a set of style features based on the skin detected for at least one subset within the set of dress images; computing a set of clusters on the at least one subset of dress images based on at least one subset of the set of style features; validating the set of clusters for the at least one subset of style features; and computing a set of validated style features and a style basis.

33 Claims, 11 Drawing Sheets

UNIVERSAL DRESS STYLE LEARNING FRAMEWORK

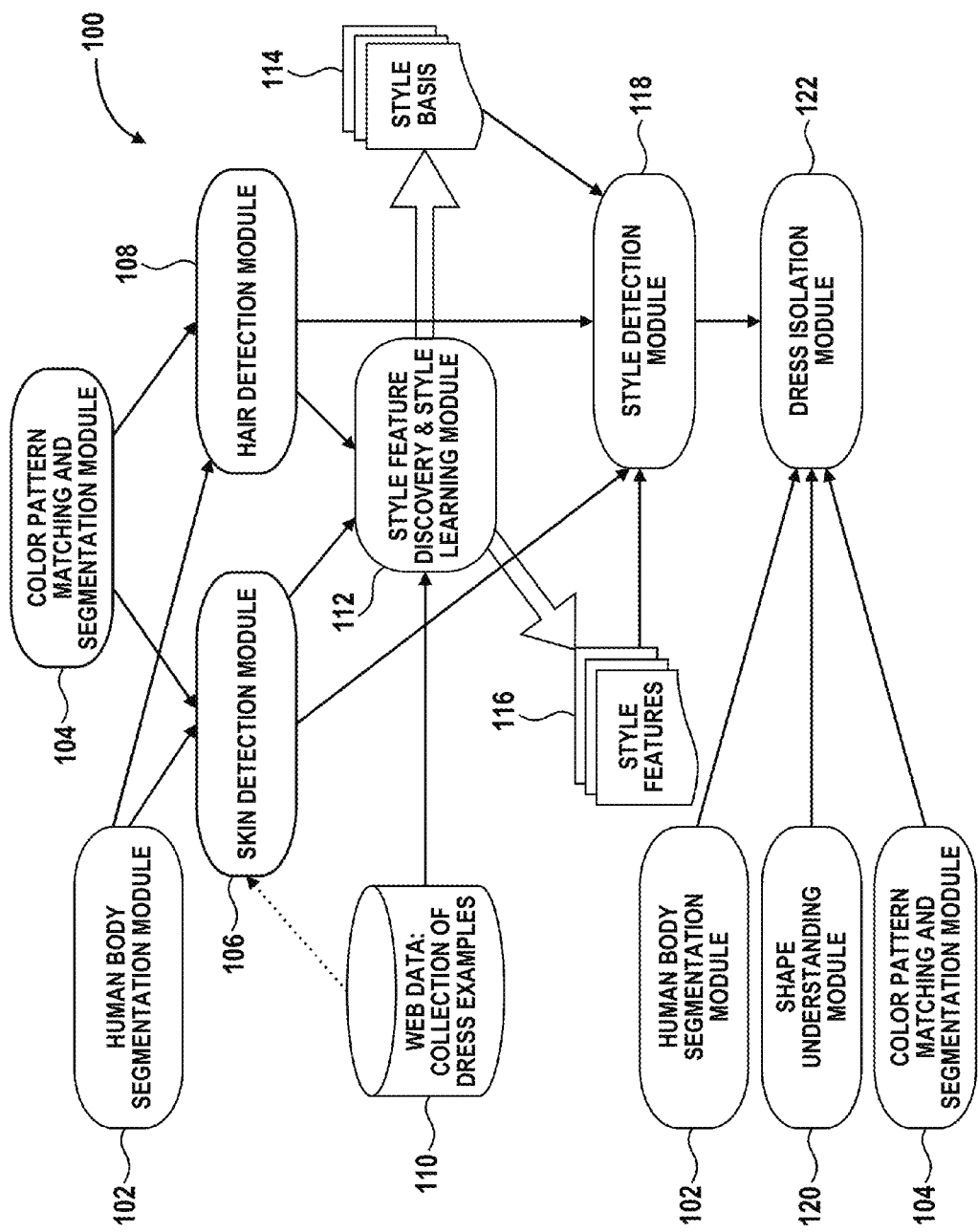
FIG. 1: UNIVERSAL DRESS STYLE LEARNING FRAMEWORK

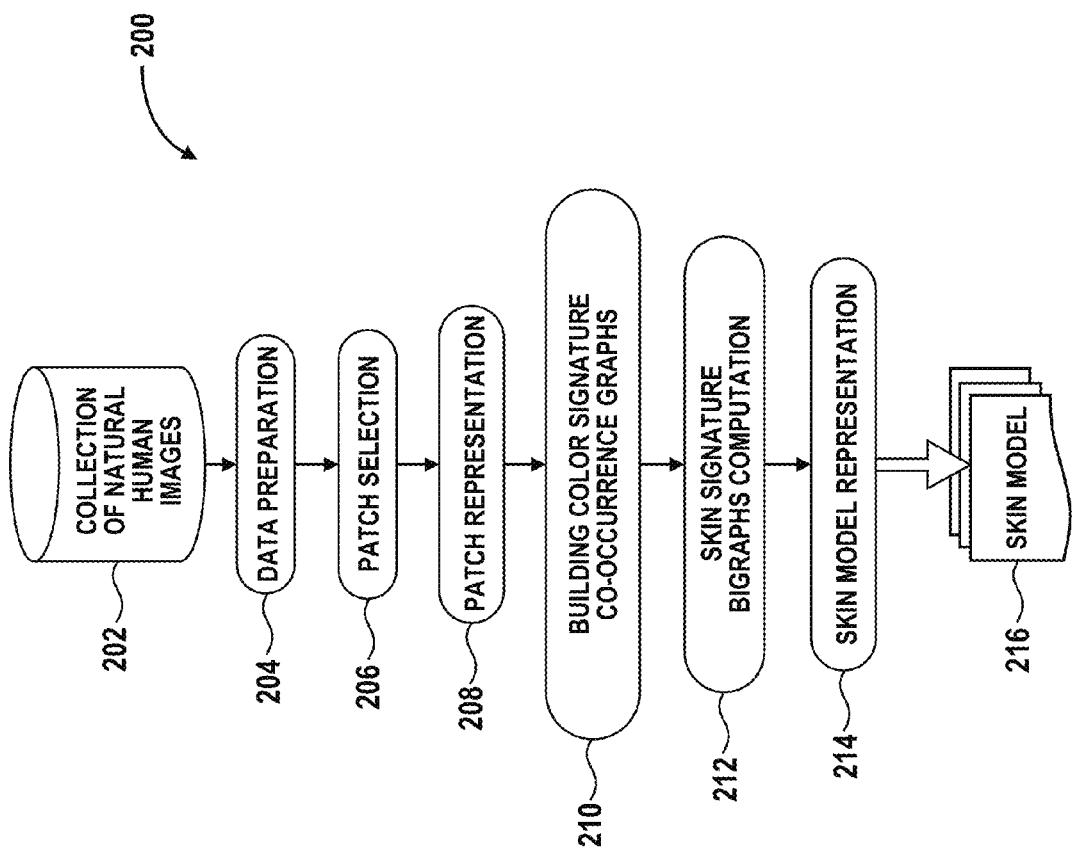
FIG. 2: SKIN MODEL BUILDER

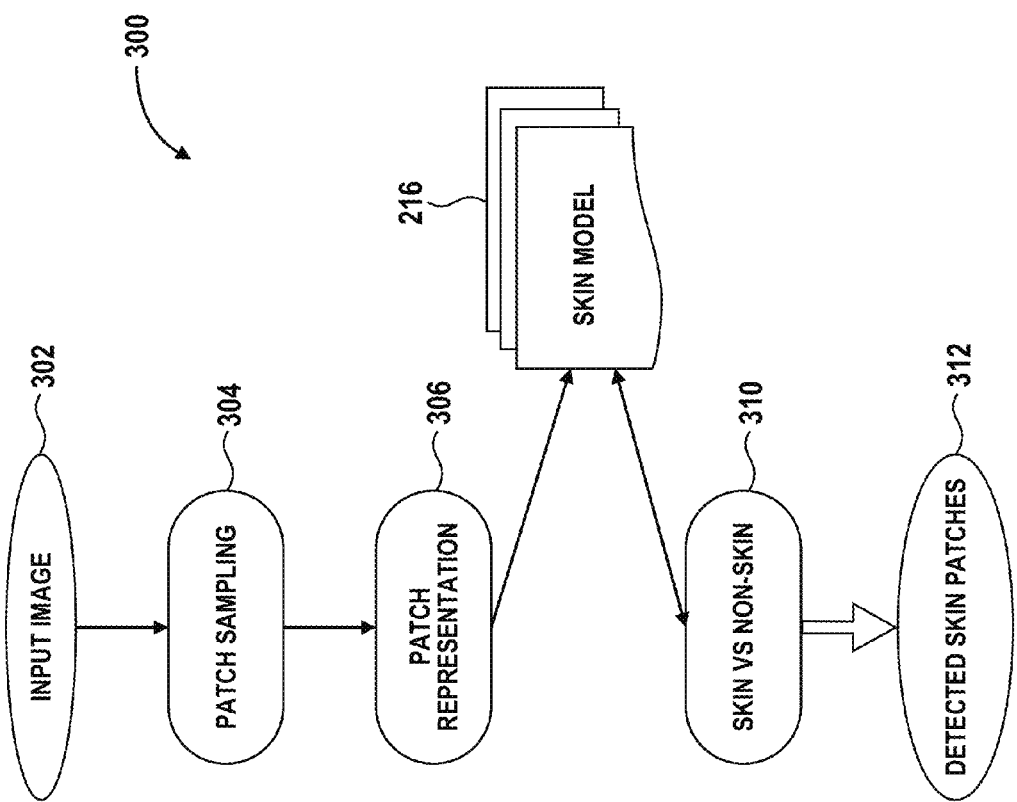
FIG. 3: SKIN DETECTOR

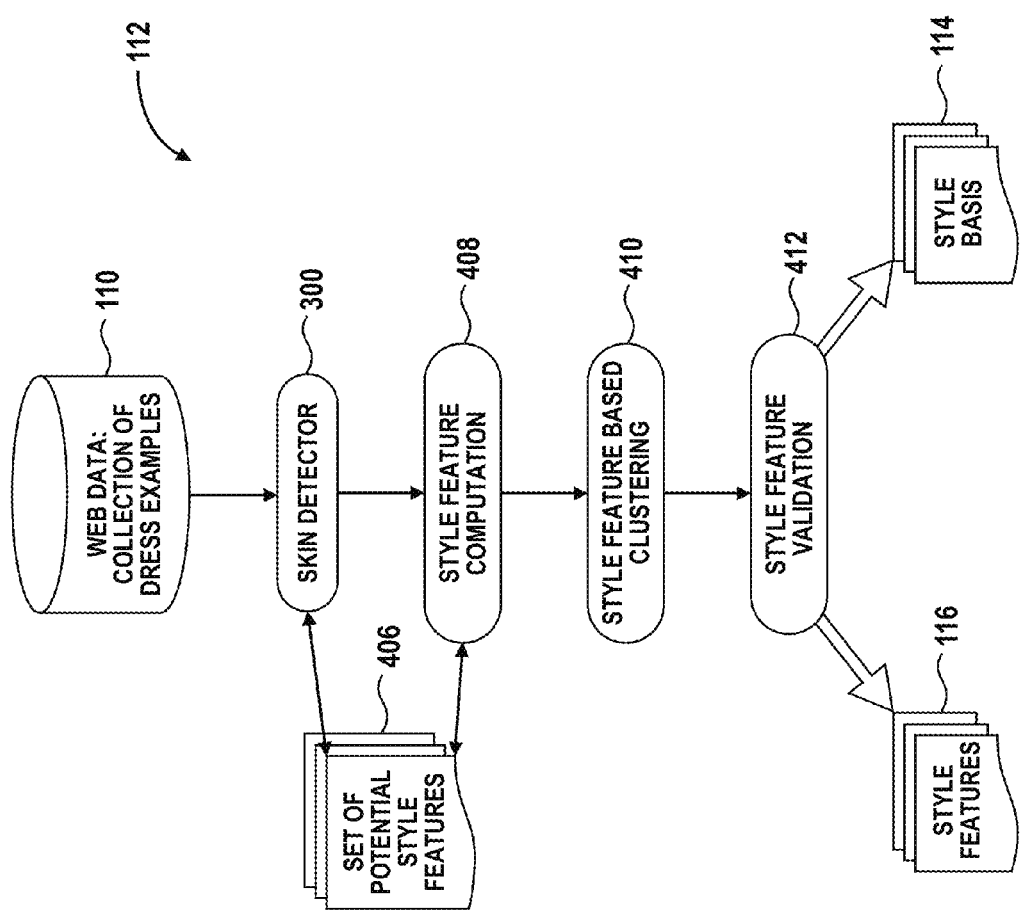
FIG. 4: STYLE FEATURE DISCOVERY AND STYLE LEARNING MODULE

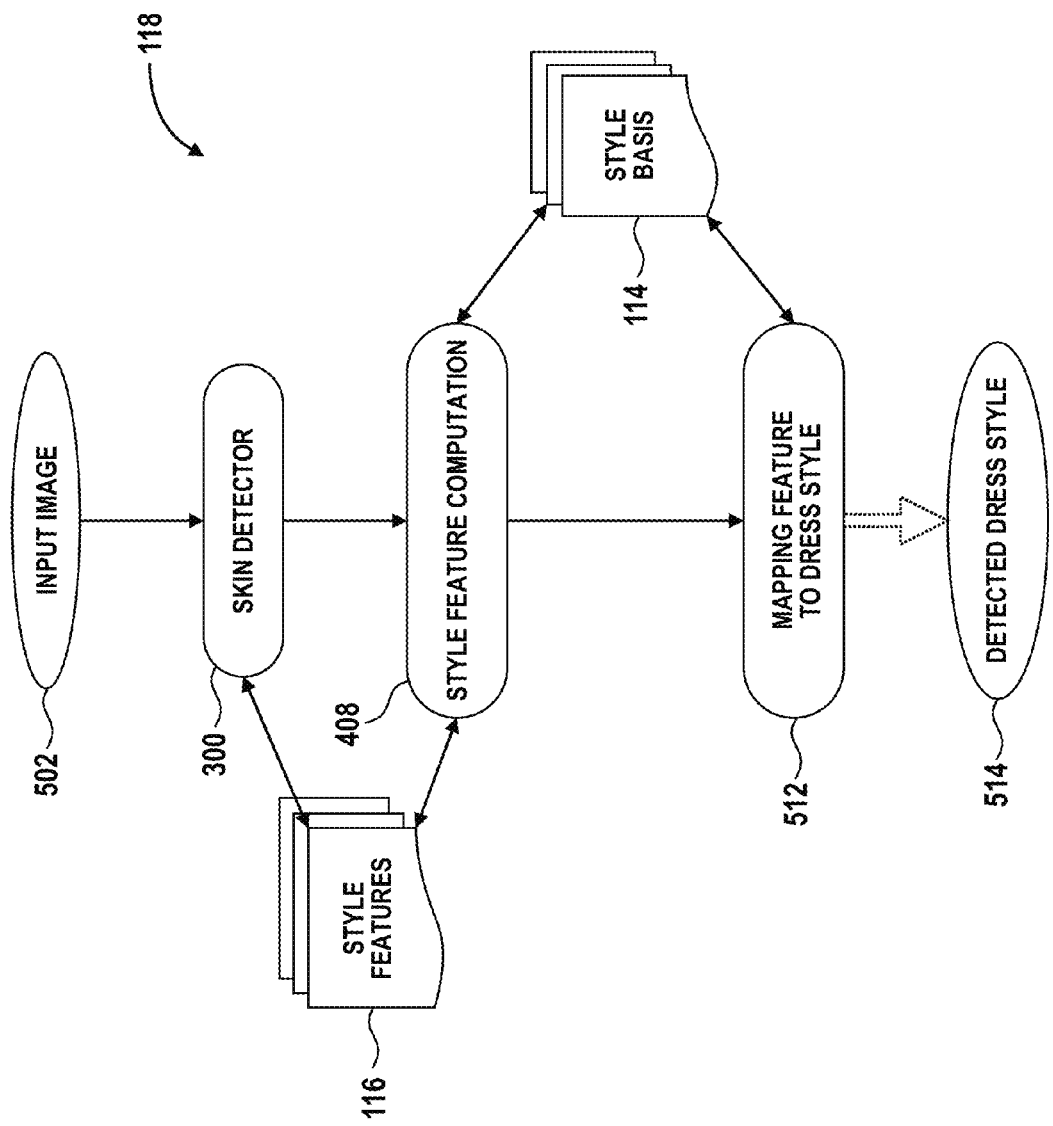
FIG. 5: STYLE DETECTION

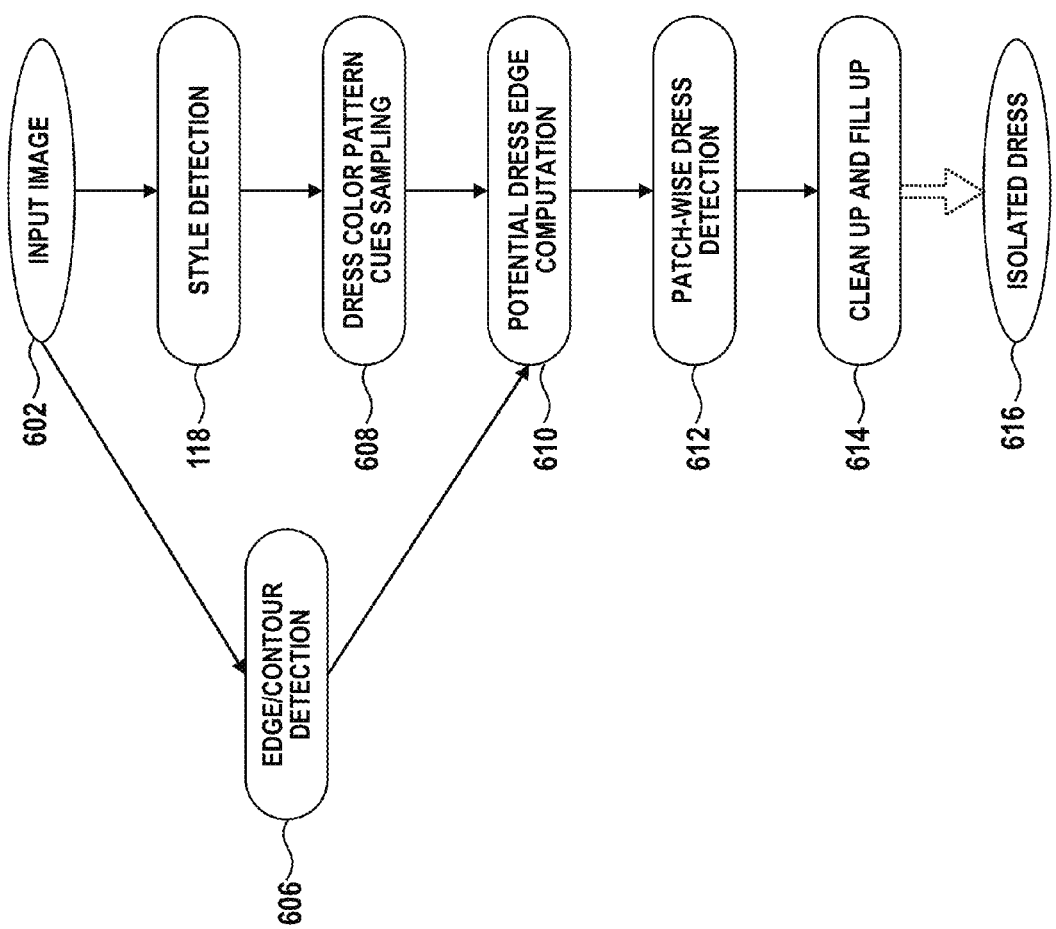
FIG. 6: DRESS ISOLATION

FIG. 7: SKIN DETECTION EXAMPLES

FIG. 8: HAIR DETECTION EXAMPLES
FIG. 9: STYLE DETECTION AND DRESS ISOLATION EXAMPLES

| INPUT IMAGE | DETECTED STYLE | ISOLATED DRESS | INPUT IMAGE | DETECTED STYLE | ISOLATED DRESS | INPUT IMAGE | DETECTED STYLE | ISOLATED DRESS |
|---|---|---|---|---|---|---|---|---|
|  | V NECK, SLEEVELESS, SHORT |  |  | V NECK, SLEEVELESS, SHORT |  |  | ASYMMETRIC, SLEEVELESS, SHORT |  |
|  | TWO PIECE, FULL SLEEVE, SHORT |  |  | LOW NECKLINE, ONE PIECE SWIMSUIT |  |  | ASYMMETRIC, SLEEVELESS, LONG |  |
|  | ASYMMETRIC SLEEVELESS, SHORT |  |  | LOW NECKLINE, SLEEVELESS, LONG |  |  | V NECK, SLEEVELESS, SHORT, JUMPER SUIT |  |

FIG. 9 (CONT'D): STYLE DETECTION AND DRESS ISOLATION EXAMPLES

METHODS AND SYSTEMS FOR BUILDING A UNIVERSAL DRESS STYLE LEARNER

CROSS-REFERENCE TO RELATED APPLICATIONS

The present application claims benefit of and priority to U.S. Provisional Application Ser. No. 61/536,196, titled "METHODS AND SYSTEMS FOR BUILDING A UNIVERSAL DRESS STYLE LEARNER," filed on Sep. 19, 2011, which is hereby incorporated by reference in its entirety and for all purposes.

FIELD

The disclosure relates generally to computer systems and applications and, more particularly, to methods and systems for building a universal dress style learner.

BACKGROUND

Given an image of a human or mannequin wearing a dress, how does one determine the dress style automatically? What's the dress' neckline? What's the hemline or sleeve length? Is it a flared dress? What colors and patterns does it have and so on? Is there a system and method to isolate this dress from the given image and further put it on a human/mannequin of another image? Additionally, can such a system and method operate in real-time such that, for example, a user can upload a picture (e.g., via a web or mobile interface) to detect the correct styles within a few seconds? Attempts to address these issues include an analysis of a variety of computer vision and machine learning problems (e.g., image segmentation), which largely remain an open problem in general.

SUMMARY

In one embodiment, a computer-implemented method for building a universal dress style learner is disclosed, said method comprising: learning human skin models; detecting skin using the learned human skin models; collecting a set of dress images worn by a model; computing a set of style features based on the skin detected for at least one subset within the set of dress images; computing a set of clusters on the at least one subset of dress images based on at least one subset of the set of style features; validating the set of clusters for the at least one subset of style features; and computing a set of validated style features and a style basis.

The systems, methods, features and advantages of the invention will be or will become apparent to one with skill in the art upon examination of the following figures and detailed description. It is intended that all such additional methods, features and advantages be included within this description, be within the scope of the invention, and be protected by the accompanying claims. It is also intended that the invention is not limited to require the details of the example embodiments.

BRIEF DESCRIPTION OF THE DRAWINGS

The accompanying drawings, which are included as part of the present specification, illustrate the presently preferred embodiment and, together with the general description given above and the detailed description of the preferred embodiment given below, serve to explain and teach the principles of the present invention.

FIG. 1 illustrates an exemplary universal dress style learning framework.

FIG. 2 illustrates an exemplary skin model builder.

FIG. 3 illustrates an exemplary skin detector.

FIG. 4 illustrates an exemplary style feature discovery and style learning module.

FIG. 5 illustrates an exemplary style detection algorithm.

FIG. 6 illustrates an exemplary dress isolation algorithm.

FIG. 7 illustrates an exemplary output of four exemplary skin detection algorithms.

FIG. 8 illustrates an exemplary output of a hair detection algorithm.

FIG. 9 illustrates an exemplary output of a style detection algorithm and a dress isolation algorithm.

Figure 10:
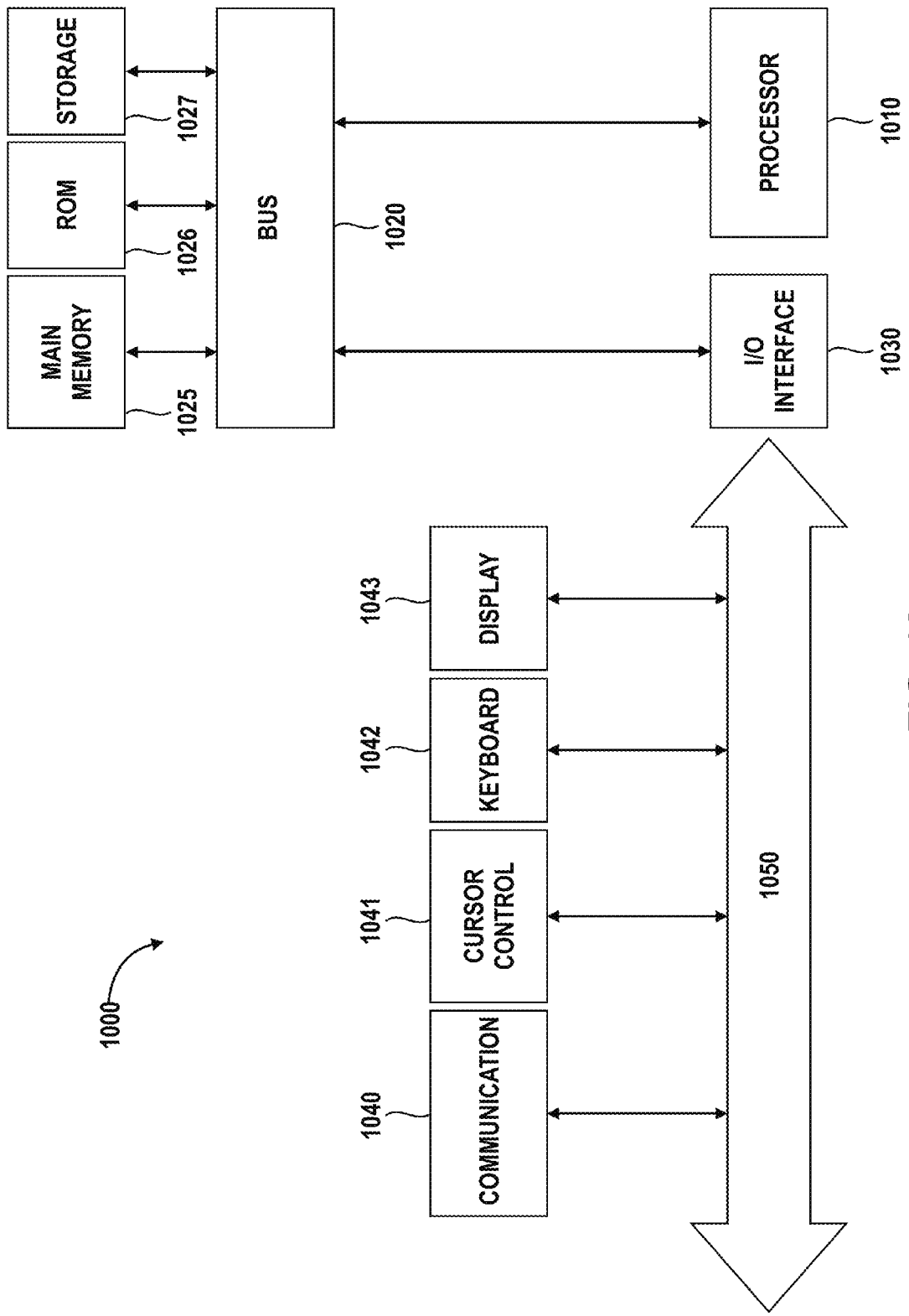
FIG. 10 illustrates an exemplary computer architecture for use with a universal dress style learning framework, according to one embodiment.

It should be noted that the figures are not necessarily drawn to scale and that elements of similar structures or functions are generally represented by like reference numerals for illustrative purposes throughout the figures. It also should be noted that the figures are only intended to facilitate the description of the various embodiments described herein. The figures do not necessarily describe every aspect of the teachings disclosed herein and do not limit the scope of the claims.

DETAILED DESCRIPTION

Given an image of a human or mannequin wearing a dress, how does one determine the dress style automatically? What's the dress' neckline, what's the hemline or sleeve length? Is it a flared dress? What colors and patterns does it have and so on? Is there a system and method to isolate this dress from the given image and further put it on a human/mannequin of another image? Additionally, can such a system and method operate in real-time such that, for example, a user can upload a picture (e.g., via a web or mobile interface) to detect the correct styles within a few seconds? Attempts to address these issues include an analysis of a variety of computer vision and machine learning problems (e.g., image segmentation), which largely remain an open problem in general. Nevertheless, systems and methods for overcoming the aforementioned obstacles are disclosed. In one embodiment, for example, systems and methods utilizing image data from communication networks, providing a universal framework to learn dress styles from this data, detecting skin and color segmentation, and discovering style features are presented. The systems and methods include a determination of the following: What and where are the body parts (e.g., face, chest, hands, legs, hairs, and so on) approximately? What regions in these parts are bare (e.g., skin)? What part in the image around the body is actually a dress and not the background? How is the dress wrapped around these different body parts? Once determined, the dress styles are captured based on this information. In one embodiment, methods and systems for determining the answers to these questions in real-time is disclosed. In an alternative embodiment, methods and systems to discover various dress styles by harnessing image collections available on the Web are also disclosed.

In one embodiment, as depicted in FIG. 1, a Universal Dress Style Learner 100 is built having various modules 102 through 122, which are described in detail below.

Universal Dress Style Learner 100 includes a Skin Detection Module 106 to provide a framework for building skin models and a variety of skin detection algorithms on top of these skin models. For example, Skin Detection Module 106 may include a skin model builder and a skin detector. FIG. 2 illustrates an exemplary skin model builder 200 and FIG. 3 depicts an exemplary skin detector 300 built on top of it.

With reference to FIG. 2, images of humans in natural conditions are collected in step 202. Such images can be collected from a number of databases (e.g., publicly available sources on the Web, image archives, video archives, etc.). Data preparation step 204 processes each image from step 202 to obtain example skin patches, along with its geometric position, on the human in the image. This process may be performed automatically, semi-automatically, or manually. In one embodiment, a face is first detected and then geometric positions of selected skin patch examples are computed with respect to the location of the face in the image. The selected skin patches are also classified as a 0th, 1st, 2nd, 3rd, or 4th type depending on whether they come from a face, chest and belly, nearby left hand, nearby right hand, or leg area, respectively. In an alternative embodiment, an image is provided, through a Web or desktop interface, to a user who selects skin patches (e.g., in the form of rectangles) from the image and the interface, saves these selected skin patches, along with their geometric position, with respect to the face, or simply their position type 0, 1, 2, 3, 4. At the end of the data preparation step 204, each image includes a set of associated skin patches and their position type information.

Next, the patch selection step 206 subdivides these selected skin patches into patches of a predefined resolution. For example, in one embodiment, the selected skin patches are subdivided into rectangular patches of size 4*4 pixels. Accordingly, at the end of the patch selection step 206, there is a set of standardized skin patches of standard size (i.e., rectangles of size 4*4 pixels) along with their position type information.

Next, in patch representation step 208, a mathematical representation is computed for each of these standardized skin patches. In one embodiment, a color histogram is computed for each standardized skin patch, and a color signature is associated with each patch depending on the properties of the respective color histogram.

To determine these color signatures, returning to FIG. 1, Universal Dress Style Learner 100 includes a Color Pattern Matching and Segmentation Module 104 to provide methods such as color histogram matching, pattern matching, and color based segmentation. For example, the basis set of colors used for color histogram computation are learned using K-means clustering in hue, saturation, and value (HSV) color space on color samples obtained from a large collection of images obtained from the Web. A color histogram similarity score between two color histograms f1 and f2 is computed by a method comprising: mapping each coordinate of f1 to K>1 coordinates of f2 and vice versa; and computing a penalty for each such coordinate mapping, wherein the penalty is computed such that the closer coordinate mapping incur smaller penalties and additional penalties are incurred if a part of a coordinate is left unmatched. A total penalty is computed as the sum of matched proportions multiplied by their respective penalties plus the penalties for the unmatched portions, wherein the best matching is found to minimize the total penalty; and wherein the penalty for the best match is declared as the value of the similarity measure. The method may alternatively compute an approximate matching by optimizing the total penalty approximately. Further description of the operation of Module 104, including color histogram matching, pattern matching, and color based segmentation, can be found in U.S. patent application Ser. No. 13/312,752, Publication No. US 2012/0140987, filed Dec. 6, 2011, entitled "Methods and Systems for Discovering Styles via Color and Pattern Co-Occurrence," which is incorporated by reference herewith in its entirety.

Accordingly, with reference again to FIG. 2, if the color histogram for a standardized skin patch has a clearly dominant component, the clearly dominant component can be declared as the color signature of the patch. Alternatively, if the color histogram does not have a clearly dominant color component, the component most similar to the original color histogram, according to a color histogram matching algorithm, is selected as the color signature of the patch. Further, each patch may be associated to a color signature type as well depending on whether its color signature corresponds to a dominant color component. Therefore, at the end of patch representation step 208, each skin patch in each image has a color signature, position type (or actual geometric position), and an associated signature type.

In one embodiment, the framework of the Skin Detection Module 106 is based on an inherent bias in the joint appearance of skin colors of various parts of the body. For instance, given a human image where face skin is of a certain color (e.g., white, brown, black, etc.), there are only certain other colors which could possibly be skin in any part of the body, even under various illumination and tanning conditions. After the patch representation step 208, a variety of Color Signature Co-occurrence Graphs (CSCGs) (step 210) is built to harness and capture this inherent bias. Color signatures make up the nodes in the graph and the edges in the graph represent the co-occurrence of the color signatures corresponding to two nodes. The weight on the CSCG indicates the strength of the co-occurrence (i.e., how often the two color signatures appear together as skin). These quantities are computed across the images from the human image collection 202. Depending on the type of the color signatures, their geometric position type, and geometric proximity, a variety of CSCGs are built.

For example, in one embodiment, 14 bipartite graphs/bigraphs (CSCGs) are built capturing the following relationships, illustrated in Table 1.

TABLE 1

| | Example CSCGs | | | | | |
|---|---|---|---|---|---|---|
| | First Set of Nodes | | Second Set of Nodes | | Patch Type | Edge Represents |
| CSCG | Position type | Color Signature Type | Position type | Color Signature Type | (skin or non-skin) | Node Relationship of Type |
| 1 | 0 | dominant | 1 | dominant | skin | Color Signature Co-occurrence |
| 2 | 0 | dominant | 2 | dominant | skin | Color Signature Co-occurrence |
| 3 | 0 | dominant | 3 | dominant | skin | Color Signature Co-occurrence |

TABLE 1-continued

Example CSCGs

| | First Set of Nodes | | Second Set of Nodes | | Patch Type | Edge Represents |
|---|---|---|---|---|---|---|
| CSCG | Position type | Color Signature Type | Position type | Color Signature Type | (skin or non-skin) | Node Relationship of Type |
| 4 | 0 | dominant | 4 | dominant | skin | Color Signature Co-occurrence |
| 5 | 0 | dominant | {0, 1, 2, 3, 4} | dominant | skin | Color Signature Co-occurrence |
| 6 | 0 | dominant | 1 | non-dominant | skin | Color Signature Co-occurrence |
| 7 | 0 | dominant | 2 | non-dominant | skin | Color Signature Co-occurrence |
| 8 | 0 | dominant | 3 | non-dominant | skin | Color Signature Co-occurrence |
| 9 | 0 | dominant | 4 | non-dominant | skin | Color Signature Co-occurrence |
| 10 | 0 | dominant | {0, 1, 2, 3, 4} | non-dominant | skin | Color Signature Co-occurrence |
| 11 | {0, 1, 2, 3, 4} | dominant | {0, 1, 2, 3, 4} | dominant | skin | Geometric proximity |
| 12 | {0, 1, 2, 3, 4} | dominant | {0, 1, 2, 3, 4} | non-dominant | skin | Geometric proximity |
| 13 | 0 | dominant | {0, 1, 2, 3, 4} | dominant | non-skin | Color Signature Co-occurrence |
| 14 | 0 | dominant | {0, 1, 2, 3, 4} | non-dominant | non-skin | Color Signature Co-occurrence |

As illustrated, in the first 10 CSCGs, a first set of nodes of the bigraphs comes from the skin patch color signature of type 0 (i.e., from face skin color signatures) and a second set of nodes comes from skin patches of position type 1, 2, 3, 4, and all combinations thereof. For the first 5 CSCGs, the second set of nodes corresponds to a dominant color signature. The second set of nodes, in the next 5 CSCGs (the 6th through 10th graph from among the 14 graphs), corresponds to a non-dominant color signature.

In the next two bigraphs (i.e., the 11th and 12th graph from among the 14 graphs), the first and second sets of nodes both correspond to skin color signature of any position type (i.e., having a combination of position Type {0, 1, 2, 3, 4}). In Table 1 above, CSCG graph 11 includes a second set of nodes corresponding to a dominant color signature type and CSCG graph 12 includes a second set of nodes corresponding to a non-dominant color signature type. The relationship of the edge between the first and second set of nodes is geometric proximity (i.e., two patches are said to co-occur only when they are within certain pixels of each other in the corresponding image).

In the next two bigraphs (i.e., the 13th and 14th graph from among the 14 graphs), the first set of nodes, again, corresponds to the face (i.e., position Type 0) skin color signature. The second set of nodes corresponds to non-skin color signature patches—one CSCG for each dominant and non-dominant signature types (i.e., CSCG graph 13 and 14, respectively).

Depending on what part and how much of the CSCGs can be harnessed, a variety of skin detection models can be built. In step 212, such skin models can be presented as a set of bipartite graphs called Skin Signature BiGraphs (SSGs), having filterable properties and constraints. For example, 27 SSGs are derived from the first 12 CSCGs (of the 14 CSCGs described in the above example) as follows, illustrated in Table 2. However, although not illustrated, it should be understood that it is possible to derive additional SSGs from the 13th and 14th CSCG to facilitate determinations of non-skin patch types. The following Table 2 is for illustration purposes, only.

TABLE 2

Example SSGs

| SSG | Corresponding CSCG | Property |
|---|---|---|
| 1 | 1 | Strong Edge of Type 1 |
| 2 | 1 | Strong Edge of Type 2 |
| 3 | 1 | Weak Edge of Type 1 |
| 4 | 1 | Weak Edge of Type 3 |
| 5 | 6 | Weak Edge of Type 2 |
| 6 | 2 | Strong Edge of Type 1 |
| 7 | 2 | Strong Edge of Type 2 |
| 8 | 2 | Weak Edge of Type 1 |
| 9 | 2 | Weak Edge of Type 3 |
| 10 | 7 | Weak Edge of Type 2 |
| 11 | 3 | Strong Edge of Type 1 |
| 12 | 3 | Strong Edge of Type 2 |
| 13 | 3 | Weak Edge of Type 1 |
| 14 | 3 | Weak Edge of Type 3 |
| 15 | 8 | Weak Edge of Type 2 |
| 16 | 4 | Strong Edge of Type 1 |
| 17 | 4 | Strong Edge of Type 2 |
| 18 | 4 | Weak Edge of Type 1 |
| 19 | 4 | Weak Edge of Type 3 |
| 20 | 9 | Weak Edge of Type 2 |
| 21 | 5 | Strong Edge of Type 1 |
| 22 | 5 | Strong Edge of Type 2 |
| 23 | 5 | Weak Edge of Type 1 |
| 24 | 5 | Weak Edge of Type 3 |
| 25 | 10 | Weak Edge of Type 2 |
| 26 | 11 | Strong Edge of Type 1 |
| 27 | 12 | Strong Edge of Type 1 |

In Table 2, a strong edge of Type 1 is defined as an edge in a CSCG if the corresponding two nodes (i.e., a node from the first set of nodes and the corresponding node from the second set of nodes) are of the same color signature, or the co-occurrence probability (i.e., weight on the edge) is greater than a first threshold (e.g., having a weight of 0.01). A strong edge of Type 2 is defined as an edge (i,j) in a CSCG if it's not a strong edge of Type 1, and if its weight is within a certain threshold (e.g., 80%) of the maximum weight of any edge emanating from i. A weak edge of Type 1 is defined as an edge in a CSCG if it's not a strong edge of any type and its co-occurrence probability (i.e., weight on the edge) is greater than a second threshold smaller than the first threshold (e.g., having a weight of 0.001).

A weak edge of Type 2 is defined for CSCGs where a second set of nodes has a color signature of a non-dominant type. Accordingly, a weak edge of Type 2 is defined in such a CSCG if the corresponding two nodes are of same color signature (irrespective of their color signature types), or the co-occurrence probability (i.e., weight on the edge) is greater than a third threshold (e.g., having a weight of 0.001). A weak edge of Type 3 is defined as an edge (i,j) in a CSCG if the similarity between the color signatures for i and j, according to a color signature distance metric, is below a given threshold and there is no strong edge of Type 1 emanating from other than (i, i). Further, strong proximity edges are defined for CSCGs where edges model geometric proximity relationships—the edges whose weight exceeds a given threshold (e.g., 0.001).

Accordingly, depending on the selected SSG to use in an analysis of a patch, a determination of a strong edge of Type 1 or 2 or of a weak edge of Type 1, 2, or 3 provides a spectrum of the likelihood that the analyzed patch represents skin. Specifically, those patches defined as a strong edge of Type 1 carry a presumption of the patch representing skin on an image, whereas, a patch defined as a weak edge of Type 3 requires additional analysis (e.g., using additional SSGs) before any such determination can be made.

As illustrated in Table 2, corresponding to the first 10 CSCGs, there are 5*5 SSGs (i.e., two sets of strong edges and three sets of weak edges for each position type 1, 2, 3, 4, and all combinations thereof). Corresponding to the next two CSCGs (i.e., the 1lth and 12th CSCG from among the 14 CSCGs), another two SSGs (i.e., one set of strong proximity edges each), for a total of 27 SSGs, comprise the representation 214 of the skin model.

The properties and constraints of these SSGs in representation 214 provide a variety of filterable skin models 216. In one embodiment, if a joint patch—one patch from the face and another patch from a position type p—belongs to the SSG corresponding to the position type p for strong edges of Type 1, strong edges of Type 2, or weak edges of Type 3, then Skin Detection Module 106 declares the joint patch to be skin. In another embodiment, a patch which fails to be detected as skin (according to strong edges of Type 1, Type 2, or weak edges of Type 3), but is in the geometric proximity of a patch which is declared to be skin, and there is a strong proximity edge corresponding to these two patches, then it is also declared as skin. In yet another embodiment, non-dominant color signature types are also included but declared as skin only if they are in geometric proximity of dominant color signatures skins and strong proximity edges exits between them.

Accordingly, skin models 216 may include a number of skin detection algorithms with various detection capabilities. Once a skin model 216 is built, the skin detection algorithm, depicted in FIG. 3, can be run in real-time. Turning to FIG. 3, given an input image 302, the patches are sampled from various parts of the image via step 304 and are represented in step 306. In one embodiment, the patch representation 306 is compatible with the corresponding patch representation 208 in skin model building module of FIG. 2. Based on the skin model 216, a sampled patch is determined to be either skin or non-skin in step 310. Combining all the sampled patches that are detected as skin, a set of detected skin patches 312 is obtained. FIG. 7 provides an example output of skin detection corresponding to four skin models, including the embodiments described above. In FIG. 7, the various algorithms 1-4 correspond to an analysis of the image based on a variety of SSGs.

Returning to FIG. 1, a Hair Detection Module 108 performs hair detection in a manner very similar to skin detection of Skin Detection Module 106. FIG. 8 depicts example outputs of an embodiment of the Hair Detection Module 108.

The Skin Detection Module 106 provides the additional capability of determining what's bare and what's not bare in a given image. With a suitable function of the skin distribution in various parts of the body, various dress styles can be determined. As an additional advantage, Universal Dress Style Learner 100 addresses the joint problem of discovering suitable style features and learning dress styles by harnessing image collections available over various data networks. For example, the vast dress image collection obtained from the Web is diverse and provides a resource for learning a variety of dress styles. Further, as the dress styles evolve, their online presence correspondingly evolves, and the styles can be incrementally learned by updating a database 110, and repeating style feature discovery and style learning methods. As presented in FIG. 4, a Style Feature Discovery and Style Learning Module 112 of FIG. 1 is illustrated in further detail.

Given the collection of dress images 110 (e.g., obtained from the Web), skin detector 300 can determined the portions of the dress images that are skin versus dresses, as previously discussed. Subsequently, a set of potential style features 406 are considered. In one embodiment, a set of d1-dimensional vectors for d1=1, 2, 3 . . . n, representing the distribution of skin in a chest area, are considered to capture the neckline style. In another embodiment, a set of d2-dimensional vectors for d2=1, 2, 3, 4 . . . n, representing the distribution of skin in a leg, are considered to capture length of the dress. In yet another embodiment, a set of d3-dimensional vectors for d3=1, 2, 3, 4 . . . n, representing the distribution of skin in a hand area (e.g., maximum of left and right hands areas), are considered to capture sleeve length of the dress. In a further embodiment, all of the above three examples are considered together (i.e., a set of (d1+d2+d3)-dimensional vectors), representing the distribution of skin in the respective three areas of the body.

Style Feature Discovery Module 112 determines which of these features, from the set of potential style features 406, are suitable for learning styles. For example, in the first embodiment of d1-dimensional vectors described above, Style Feature Discovery Module 112 determines the value of d1 that provides the best resources of learning the neckline of dresses. In one embodiment, a Style Feature Computation Module 408 selects these features via an iterative process of clustering (via Style Feature Based Clustering module 410) the given image collection 402 based on a given feature, and validating if the clusters make any sense in terms of dress styles (via Style Feature Validation Module 412). For each feature in the set of potential style features 406, the Style Feature Based Clustering Module 410 and Style Feature Validation Module 412 repeat the clustering and validation process to select style features 116, from the set of potential style features 406, that perform best in the validation phase.

Once the style features 116 are selected, the clusters corresponding to these features make up the various styles. A representation for each cluster, in terms of the selected features, is chosen. The set of these representative feature values for the clusters are included in the learned Style Basis 114. In the clustering phase of Style Feature Based Clustering Module 410, for each image in the collection 110, a function $f$ is evaluated such that two images are put in the same cluster if the values off for the two images are very close according to a given distance metric. For example, in the example of d1-dimensional vectors, K-means clustering with Euclidean distance may be used. In the validation phase of Style Feature Validation Module 412, each of the clusters obtained from Style Feature Based Clustering Module 410 are examined to see if they make sense in terms of dress styles. Thus, in the dress neckline example discussed above, Style Feature Validation Module 412 determines whether each cluster corresponds to various dress necklines (e.g., v-neck, round neck, low-neckline, asymmetric neckline, etc.).

The validation phase of Style Feature Validation Module 412 can be performed manually, semi-automatically, or automatically. In one embodiment, textual tags associated with images (e.g., metadata) can be aggregated for each cluster automatically. If the textual tags emerging from these clusters are "meaningful," the corresponding feature of the cluster is selected as a "good style feature." For example, a "meaningful" cluster may correspond to tags related to fashion or dress styles (e.g., v-neck).

In this manner, the set of style features 116 and the corresponding style basis 114 are determined as a result of Style Feature Discovery and Style Learning Module 112. For example, using image collections 110 obtained from various Hollywood/Bollywood award ceremonies and fashion shows available on the Web, a 15-dimensional neckline feature, two 4-dimensional sleeve style features, and a 4-dimensional length style feature are selected to be included as style features 116. Correspondingly, a style basis containing 5 elements of neckline type (e.g., v-neck, low-neckline, high-neckline, two asymmetric/one shoulder types), 3 elements of dress length type (e.g., two long, one short), and 4 elements of sleeve length type (e.g., sleeveless, short sleeve, ¾-sleeve, full sleeve) are also selected to be included as style basis 114.

With reference again to FIG. 1, once the set of suitable style features 116 and corresponding style basis 114 are selected, a Style Detection Module 118 can be built on top to determine the style using these resources, as illustrated in FIG. 5. Turning to FIG. 5, given an image 502, the skin is first detected using the skin detector 300. Then, the style features 116 are computed in step 408 based on the detected skin patches. In step 512, these computed features are suitably mapped to the style basis 114 to obtain the dress styles 514. Some examples of style detection of Module 118 are shown in FIG. 9.

In another embodiment, after styles are discovered, the Universal Dress Style Learner 100 provides the advantage of isolating specific dresses from an image. A Dress Isolation Module 122 is illustrated in FIG. 6. With reference to FIG. 6, given an image 602, a Style Detection Module 118 first detects the style using methods previously described above. Based on the detected style of the dress, a set of color and pattern cues are sampled in step 608. For example, if the detected style of dress includes a low neckline short sleeveless dress, color pattern cues are sampled only from the belly area and upper leg/waist area. If the detected style of dress includes a dress with sleeves, then additional cues are sampled from the hand as well. These color pattern cues can be computed at various levels of resolution and a dress complexity score can also be computed based on a similarity or dissimilarity of the computed set of color pattern cues.

In step 606, a set of edge points are computed using an edge detection or contour detection algorithm (e.g., Canny Edge Detection algorithm). A subset of these edge points corresponds to the outline of the dress in the image. The Potential Dress Edge Computation step 610 subsequently tries to detect this subset. Using the dress color pattern cues computed in step 608, Potential Dress Edge Computation 610 decides if an edge point is likely to be an actual dress edge point or not. In order to determine this likelihood, a color histogram matching algorithm and a pattern matching algorithm are used. Once the potential dress edges from the subset are computed, all patches falling inside the region covered by these potential dress edge points are tested in step 612 to determine if they actually represent a dress. This can also be performed using a similar color pattern matching algorithm. In one embodiment, if the color histogram for a patch is within a certain threshold of a dress color cue, then it is declared as a dress patch. Skin Detection Module 106 may also be used during this step. In another embodiment, if a patch is close enough to both a dress color pattern cue as well as skin, then the patch is declared as a dress only if its similarity score to a dress cue is greater than the similarity score to a skin patch color representation. Patch-Wise Dress Detection step 612 then outputs a set of detected dress patches from the given image. These combined patches make up the isolated dress 616.

In an alternative embodiment, a cleanup and filling up step 614 is included to detect certain dress patches that may be removed and to include additional patches based on the relative geometry of the detected dress patches. As an example, any small connected subset of dress patches, which are geometrically far from the biggest subset of connected dress patches, are removed and any patch, which is geometrically similar to patches from all of the four sides of the subset that are already detected as dress, is similarly declared as dress. In this example, the updated set of detected dress patches make up the isolated dress 616. Example outputs from the Dress Isolation Module 122 are shown in FIG. 9.

In yet another embodiment, performing the task of skin model building, skin detection, style feature discovery, style detection, and dress isolation may include some additional modules.

First of these is Human Body Segmentation Module 102. This module is responsible for approximate human detection, face detection, body parts estimation, pose estimation, etc. In one embodiment, a standard Haar feature and Adaboost based face-detection algorithms and support vector machines (SVM) with a histogram of oriented gradient features based human detection scheme are used. Using the face as an anchor, a rough estimate of other body parts/regions can be estimated. In another embodiment, if a corresponding depth image (e.g., one taken by a Kinect depth sensor) is available, it's used to detect the human body in the image. In yet another embodiment, if a human body segmentation is performed with a user interface where users can provide two images with the same background, but with displaced body, then a background subtraction is used to obtain the human body.

The Human Body Segmentation module 102 can also provide a much deeper understanding of various body parts in combination with the Skin Detection Module 106. The detected skin patches using Skin Detection Module 106 are processed to get a set of connected skin segments in terms of geometric proximity.

An outline of these various segments is computed using both the segment boundaries and edges computed using a Shape Understanding Module 120, which will be further described below. These outlines include various parts of the body depending on their geometry relative to the face. The body parts computed using this process can also be used in Style Feature Discovery and Style Learning Module 112 and Style Detection Module 118.

Shape Understanding Module 120 provides methods for edge detection such as, but not limited to, Canny Edge Detector, Contour tracing (e.g., Moore-Jacob Neighborhood algorithms), shape stitching, etc.

FIG. 10 illustrates an exemplary computer architecture 1000 for use with the present system, according to one embodiment. One embodiment of architecture 1000 comprises a system bus 1020 for communicating information, and a processor 1010 coupled to bus 1020 for processing information. Architecture 1000 further comprises a random access memory (RAM) or other dynamic storage device 1025 (referred to herein as main memory), coupled to bus 1020 for storing information and instructions to be executed by processor 1010. Main memory 1025 also may be used for storing temporary variables or other intermediate information during execution of instructions by processor 1010. Architecture 1000 also may include a read only memory (ROM) and/or other static storage device 1026 coupled to bus 1020 for storing static information and instructions used by processor 1010.

A data storage device 1027, such as a magnetic disk or optical disc and its corresponding drive, may also be coupled to computer system architecture 1000 for storing information and instructions. Architecture 1000 can also be coupled to a second I/O bus 1050 via an I/O interface 1030. A plurality of I/O devices may be coupled to I/O bus 1050, including a display device 1043, an input device (e.g., an alphanumeric input device 1042 and/or a cursor control device 1041).

A communication device 1040 allows for access to other computers (servers or clients) via a network. The communication device 1040 may comprise one or more modems, network interface cards, wireless network interfaces or other well known interface devices, such as those used for coupling to Ethernet, token ring, or other types of networks.

Figure 11:
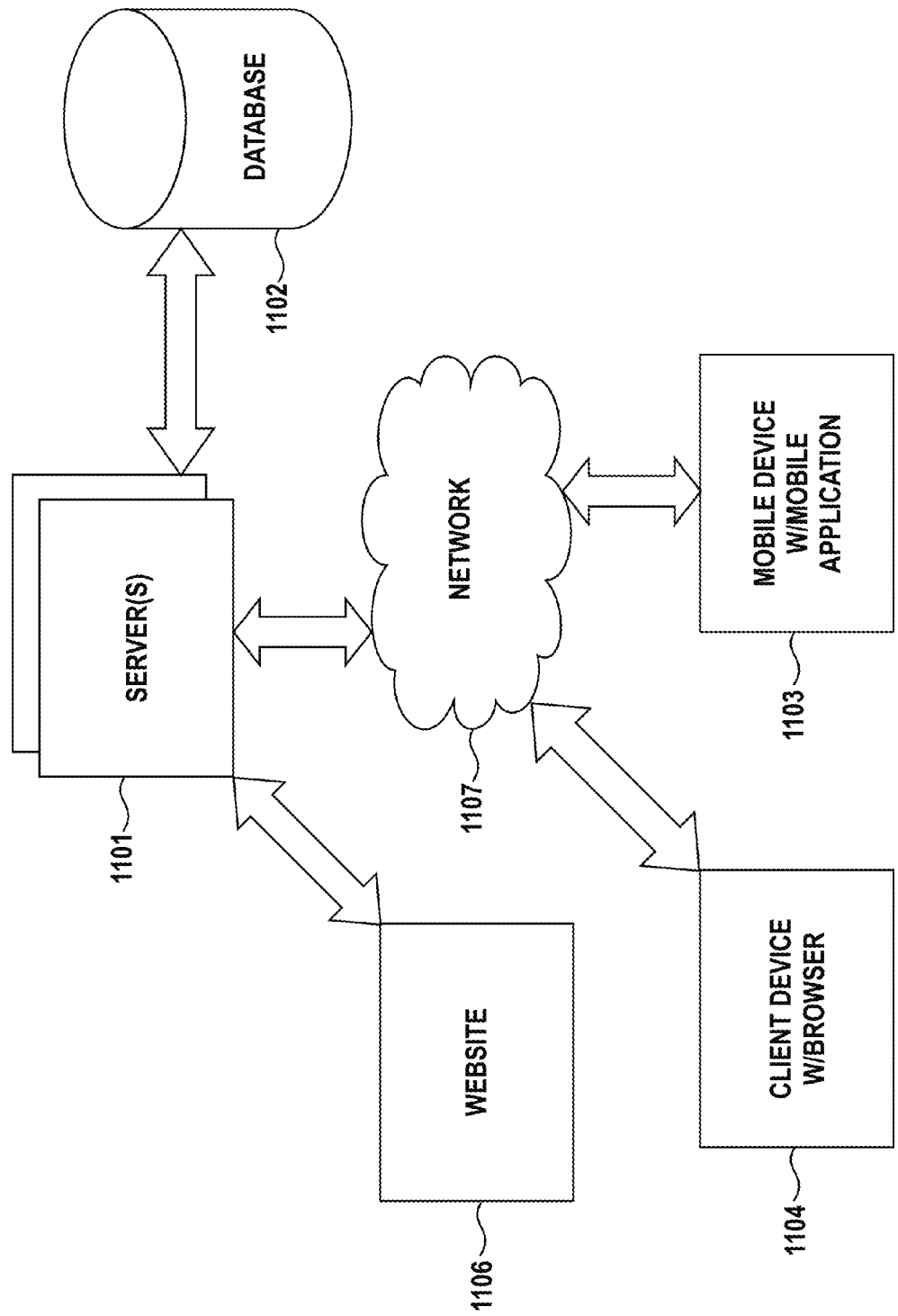
FIG. 11 illustrates an exemplary system level layout for use with a universal dress style learning framework, according to one embodiment.

FIG. 11 illustrates an exemplary system level layout for use with the present system, according to one embodiment. A server (or plurality of servers) 1101, having software according to the present disclosure, is in communication with a network 1107 and a database 1102. It is understood that the database 1102 may be a separate entity from the server 1101 (or plurality of servers), or the database 1102 may reside on the server 1101 (or plurality of servers) without departing from the scope of the present disclosure. Included in the server 1101 (or plurality of servers) is a web server, for hosting a website 1106 accessible by any client computing device having a browser 1104 in communication over the network 1107. A mobile device having a mobile application 1103 for use with the present system is also in communication with the network 1107 in order to provide necessary information to the server 1101.

In the description above, for purposes of explanation only, specific nomenclature is set forth to provide a thorough understanding of the present disclosure. However, it will be apparent to one skilled in the art that these specific details are not required to practice the teachings of the present disclosure.

Some portions of the detailed descriptions herein are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk, including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms presented herein are not inherently related to any particular computer or other apparatus. Various general purpose systems, computer servers, or personal computers may be used with programs in accordance with the teachings herein, or it may prove convenient to construct a more specialized apparatus to perform the required method steps. The required structure for a variety of these systems will appear from the description below. It will be appreciated that a variety of programming languages may be used to implement the teachings of the disclosure as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter.

It is also expressly noted that the dimensions and the shapes of the components shown in the figures are designed to help to understand how the present teachings are practiced, but not intended to limit the dimensions and the shapes shown in the examples.

Systems and methods for discovering styles via color and pattern co-occurrence have been disclosed. It is understood that the embodiments described herein are for the purpose of elucidation and should not be considered limiting the subject matter of the disclosure. Various modifications, uses, substitutions, combinations, improvements, methods of productions without departing from the scope or spirit of the present invention would be evident to a person skilled in the art.

What is claimed is:

1. A computer-implemented method for universal dress style learning comprising:
   learning human skin models;

detecting skin using the learned human skin models;

collecting a set of dress images, each image of the set of dress images having a dress;

computing a set of style features based on the detected skin for at least one subset of the set of dress images;

computing a set of clusters on the at least one subset of dress images based on at least one subset of the set of style features;

validating the set of clusters; and computing a set of validated style features and a style basis based on the set of clusters, the set of validated style features and style basis enabling isolation of the dress of each image.

2. The computer implemented method of claim 1 wherein said learning human skin models further comprises:

collecting a set of natural human images, each natural human image having a face;

computing a set of skin patches and their geometric location with respect to the face for at least one image in at least one subset of the set of natural human images;

computing a position type for at least one skin patch from the set of skin patches;

subdividing the at least one skin patch into a set of patches of a specified resolution;

computing a color signature for the at least one skin patch from the set of skin patches of the specified resolution;

building a set of color signature co-occurrence graphs (CSCGs), wherein nodes of the CSCGs represent the color signatures and edges of the CSCGs represent a co-occurrence of the color signatures corresponding to a set of two nodes computed across the at least one skin patch from the set of skin patches of the specified resolution, and a weight of an edge indicates the strength of the co-occurrence;

computing the skin models represented as a set of skin signature bipartite graphs (SSGs), the SSGs having filterable properties and constraints.

3. The computer implemented method of claim 2, said collecting the set of natural human images comprises receiving the images from a group of sources consisting of World Wide Web, image archives, video archives, fashion shows, award ceremonies, fashion magazines, and user uploaded images via a mobile application.

4. The computer implemented method of claim 2, said computing the set of skin patches comprises providing an editorial interface for tagging the set of skin patches as skin or non skin.

5. The computer implemented method of claim 2, said computing the position type further comprises detecting the face in the at least one image and assigning the position type for a given patch as type 0, 1, 2, 3, 4, depending on whether the patch comes from the face, a chest or belly, a nearby left hand, a nearby right hand, or a leg area.

6. The computer implemented method of claim 2, said subdividing the at least one skin patch further comprises dividing the at least one skin patch into rectangular patches of size r*r pixels for a specified constant r.

7. The computer implemented method of claim 6, wherein the specified constant r is 4.

8. The computer implemented method of claim 2, said computing the color signature for further comprises computing a color histogram for the at least one skin patch and assigning the color signature to the skin patch based on predetermined properties of the color histogram.

9. The computer implemented method of claim 8, wherein a clearly dominant component of the color histogram is declared as the color signature.

10. The computer implemented method of claim 8, wherein a color component most similar to the color histogram is declared as the color signature.

11. The computer implemented method of claim 8, wherein the at least one skin patch in the set of skin patches of the specified resolution is assigned a color signature type selected from a color signature group consisting of a dominant color component of the color histogram and a non-dominant color component of the color histogram.

12. The computer implemented method of claim 2, said building the set of color signature co-occurrence graphs (CSCGs) further comprises:

creating nodes in a bipartite graph for a subset of color signatures, the subset including at least two of the color signatures;

mapping the at least two color signatures to at least two nodes Nc1 and Nc2 in the graph for at least two patches p1 and p2 in the set of skin patches of the specified resolution; and updating the weight of the edge between Nc1 and Nc2 when p1 and p2 satisfy a co-occurrence criteria.

13. The computer implemented method of claim 12, wherein a first set of nodes of the bipartite graph includes skin patch color signatures of position type 0 and a second set of nodes of the bipartite graph includes skin patch color signatures of position types having a subset of position types {0, 1, 2, 3, 4}, the subset of position types containing at least one element from {1, 2, 3, 4}, and wherein the co-occurrence criteria is satisfied when the patch p1 and p2 come from the same image.

14. The computer implemented method of claim 12, wherein a first set of nodes of the bipartite graph includes skin patch color signatures of position types having a first subset of position types {0, 1, 2, 3, 4}, the first subset of position types containing at least one element and a second set of nodes of the bipartite graph consists of skin patch color signatures of position types consisting of a second subset of position types {0, 1, 2, 3, 4}, the second subset of position types containing at least one element from {1, 2, 3, 4}, and wherein the co-occurrence criteria is satisfied if the patch p1 and p2 come from the same image and are geometrically within certain pixels of each other.

15. The computer implemented method of claim 12, said computing the color signature further comprises computing a color histogram for the at least one skin patch and assigning the color signature to the skin patch based on predetermined properties of the color histogram, wherein the at least one skin patch in the set of skin patches of the specified resolution is assigned a color signature type selected from a color signature group consisting of a dominant color component of the color histogram and a non-dominant color component of the color histogram, and wherein a first set of nodes and a second set of nodes of the bipartite consist of skin patch color signatures having the dominant color.

16. The computer implemented method of claim 12, said computing the color signature further comprises computing a color histogram for the at least one skin patch and assigning the color signature to the skin patch based on predetermined properties of the color histogram, wherein the at least one skin patch in the set of skin patches of the specified resolution is assigned a color signature type selected from a color signature group consisting of a dominant color component of the color histogram and a non-dominant color component of the color histogram, and wherein a first set of nodes of the bipartite graph consists of skin patch color signatures with a dominant color and a second set of nodes of the bipartite graph consist of skin patch color signatures having the non-dominant color.

17. The computer implemented method of claim 12, wherein a first set of nodes of the bipartite graph consists of skin patch color signatures of position type 0 and a second set of nodes of the bipartite graph consists of non-skin patch color signatures of position types having a subset of {0, 1, 2, 3, 4}, the subset containing at least one element, and wherein the co-occurrence criteria is satisfied if the patch p1 and p2 come from the same image.

18. The computer implemented method of claim 2, wherein computing a set of skin signature bigraphs (SSGs) further comprises:
selecting a subset of color signature co-occurrence graphs (CSCGs), the subset including at least one CSCG;
for the at least one CSCG, computing a set of strong edges of type 1 from a subset of edges of the CSCG, each edge of the set of strong edges of type 1 having at least one of: the corresponding nodes of the edge being of the same color signature and the weight of the edge being greater than a first threshold;
for the at least one CSCG, computing a set of strong edges of type 2 from a subset of edges of the CSCG, each edge (Nc1, Nc2) of the set of strong edges of type 2 being not a strong edge of type 1 and having the weight of the edge is within a predefined threshold of the maximum weight of any edge emanating from Nc1;
for the at least one CSCG, computing a set of weak edges of type 1 from a subset of edges of the CSCG, each edge of the set of weak edges of type 1 being not of a strong edge of type 1 and 2 and having the weight of the edge being greater than a second threshold, the second threshold being smaller than the first threshold;
for the at least one CSCG, computing a set of weak edges of type 2 from a subset of edges of the CSCG, each edge (Nc3, Nc4) of the set of weak edges of type 2 having at least one of: the corresponding two nodes of the edge being of the same color signature and the weight of the edge is greater than a third threshold, wherein the color signature of the second node Nc4 is of type non-dominant;
for the at least one CSCG, computing a set of weak edges of type 3 from a subset of edges of the CSCG, each edge (Nc5, Nc6) of the set of weak edges of type 3 having the similarity between color signatures for Nc5 and Nc6 according to a color signature distance metric being below a certain threshold and only one strong edge of type 1 emanating from Nc5 wherein Nc5 and Nc6 have the same color signature; and
for the at least one CSCG, computing a set of proximity edges from a subset of edges of the CSCG, each edge of the set of proximity edges having the weight of the edge being greater than a fourth threshold and the co-occurrence criteria being based on geometric proximity.

19. The computer implemented method of claim 18, further comprising building a set of skin detection algorithms using the computed set of skin signature bigraphs (SSGs) comprising:
selecting a subset of the SSGs, the subset containing at least one SSG;
computing the face in a given image;
computing a second color signature for the computed face;
sampling a set of patches from the given image;
computing the second color signatures for the set of patches, the set of patches containing at least one patch; and
classifying the at least one patch to be skin if the computed second color signature for the face and the computed second color signature of the patch forms an edge in the selected at least one SSG.

20. The computer implemented method of claim 19, further comprising classifying the at least one patch to be skin where there is at least one additional edge emanating from the computed second color signature of the patch in at least one additional SSG.

21. The computer implemented method of claim 1, wherein the set of style features are based on skin distribution across various parts of the body.

22. The computer implemented method of claim 1, said computing the set of clusters is based on computing clusters from a group consisting of: K-means clusters, K-medoid clusters, connected component of a graph, and agglomerative clustering through optimizing graph modularity.

23. The computer implemented method of claim 1, said validating the set of clusters includes at least one of manually validating, semi-automatically validating, and fully automatically validating.

24. The computer implemented method of claim 1, further comprising:
computing a set of skin patches for a given image;
computing the set of style features for the computed set of skin patches; and
computing a set of dress styles by mapping the computed set of style features to a style basis.

25. The computer implemented method of claim 1, further comprising isolating the dress from a selected dress image, said isolating comprising:
computing a set of dress styles for the selected dress image;
computing color and pattern cues from a set of samples in the selected dress image based on the computed set of dress styles;
computing a set of edge points in the selected dress image using at least one of edge detection and contour detection;
computing a set of potential dress edge points using the computed set of edge points, the computed color and pattern cues, and a color and pattern similarity metric; and
computing a set of patches from a region defined by the computed set of potential dress edge points;
computing color histograms for the computed set of patches; and
computing a set of detected dress patches from the computed set of patches based on the color histograms of the computed set of patches and the computed color and pattern cues.

26. The computer implemented method of claim 25, said computing the color and pattern cues comprises computing the color and pattern cues at various levels of resolutions and computing a dress complexity score.

27. The computer implemented method of claim 25, said computing the set of detected dress patches comprises determining whether the color histogram of the computed set of patches is within a certain threshold of a dress color cue.

28. The computer implemented method of claim 25, further comprising cleaning and filling up the computed set of detected dress patches based on the relative geometry of the computed set of detected dress patches as well as some context.

29. The computer implemented method of claim 28, said cleaning and filling up the dress patches further comprises cleaning a connected subset of detected dress patches of a size smaller than a certain predefined threshold size and classifying any patch being geometrically within a region defined by the detected dress patches as the dress.

30. The computer implemented method of claim 1, further comprising:
    computing a set of skin patches for a given image;
    computing a set of connected skin segments based on geometric proximity using the computed set of skin patches;
    computing the outlines of the computed set of connected skin segments; and
    estimating a set of body parts using the computed outlines.

31. The computer implemented method of claim 8, further comprising computing a color histogram similarity score between two color histograms f1 and f2 by:
    mapping each coordinate of f1 to K>1 coordinates of f2 and vice versa;
    computing a penalty for each coordinate mapping, wherein closer coordinate mapping incurs smaller penalties and unmapped coordinates incur greater penalties; and
    computing a total penalty as the sum of mapped coordinates, multiplied by their respective penalties plus the penalties for the unmapped coordinates,
    wherein the best matching minimizes the total penalty, and
    wherein the penalty for the best match is declared as the value of the similarity score.

32. A universal dress style learner system comprising:
    a skin detection module for learning human skin models and detecting skin using the human skin models; and
    a style feature discovery and style learning module in communication with said skin detection module for computing a set of style features based on the detected skin for a set of dress images, each image of the set having a dress worn by a model, and for computing a set of clusters on the set of dress images based on at least one subset of the set of style features,
    wherein said style feature discover and style learning module further compute a set of validated style features and a style basis based on the set of clusters.

33. A non-transitory computer readable medium having stored thereon a plurality of instructions, said plurality of instructions executable by a processor, said plurality of instructions for:
    learning human skin models;
    detecting skin using the learned skin models;
    collecting a set of dress images, each image of the set having a dress worn by a model;
    computing a set of style features based on the detected skin for at least one subset within the set of dress images;
    computing a set of clusters on the at least one subset of dress images based on at least one subset of the set of style features;
    validating the set of clusters for the at least one subset of the set of style features; and
    computing a set of validated style features and a style basis based on the set of clusters.

* * * * *